Dec. 24, 1968 D. R. WILDER 3,418,418

PHASE SHIFT VIBRATO CIRCUIT USING LIGHT DEPENDENT RESISTORS AND AN INDICATING LAMP

Filed May 25, 1964

Inventor
Dallas Richard Wilder
By Pendleton, Neuman, Seibold & Williams
Attorneys United States Patent Office 3,418,418
Patented Dec. 24, 1968

3,418,418

PHASE SHIFT VIBRATO CIRCUIT USING LIGHT DEPENDENT RESISTORS AND AN INDICATING LAMP

Dallas Richard Wilder, 6731 N. Ionia, Chicago, Ill. 60646

Filed May 25, 1964, Ser. No. 369,749
4 Claims. (Cl. 84—1.25)

ABSTRACT OF THE DISCLOSURE

The present application discloses a vibrato circuit in which the phase of a low level input is shifted by a plurality of cascaded phase shifting circuits. Each of the phase shifting circuits incorporates a light dependent resistor (LDR) as a variable impedance element, and the LDR of each of the circuits is mounted in a light-tight chamber with a lamp. The lamp is excited by an oscillator which produces a signal at the vibrato frequency. The output of the cascaded phase shift circuit is connected through a power amplifier to a utilization device such as a loudspeaker.

Figure 1:
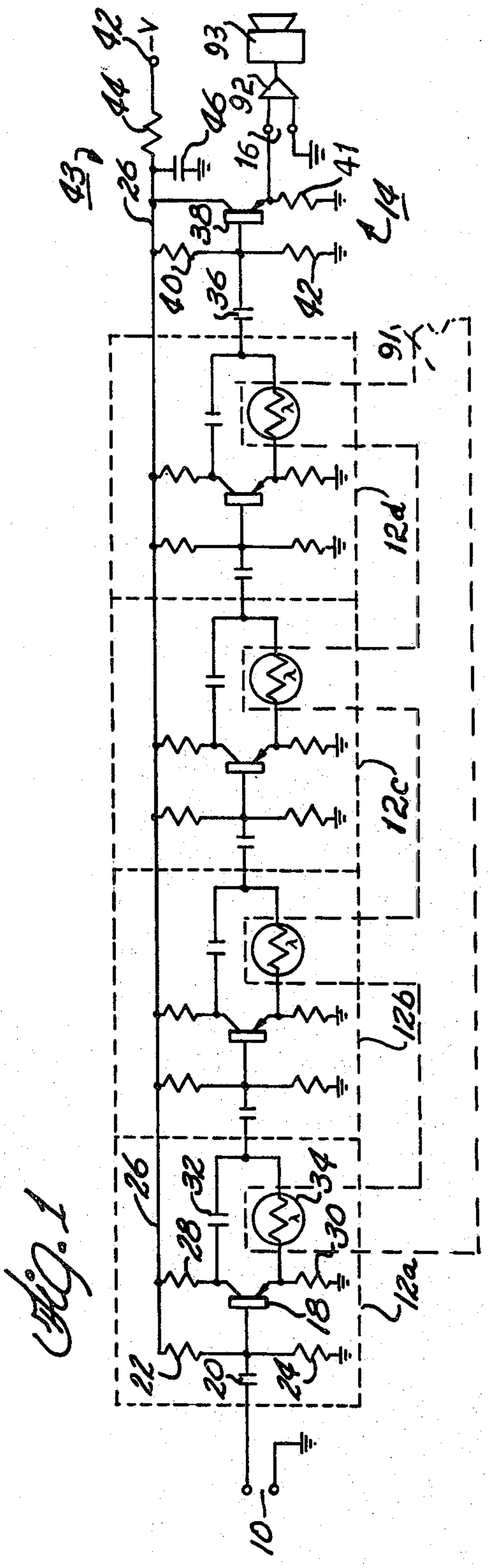

This invention relates to vibrato circuits for modulating a program signal, and more particularly to such circuits adapted for use in conjunction with program signals originating in musical instruments.

Vibrato circuits have long been used in connection with electric guitars, electronic organs and the like, in order to add a vibrato effect to the music produced by such instruments. Many of the circuits known in the prior art for this purpose achieve a simulated vibrato effect by amplitude modulating the audio frequency program signal with a subaudio vibrato modulating signal. This approach is undesirable, however, for the ear can readily distinguish between a true vibrato in which the frequency of the program signal is modulated and the artificially produced amplitude modulated vibrato.

In one prior art circuit, however, the program signal is phase modulated with a vibrato signal. This results in an audio effect which is indistinguishable from frequency modulated vibrato, and is therefore much superior to the amplitude modulated type. However, the known circuitry for achieving the phase modulated vibrato effect has been relatively complicated and expensive to manufacture, and it is therefore desirable to provide circuitry for producing the desired effect which is simpler and more economical.

It has been known to use a pair of varistors in a phase shifting circuit, the resistance of the thermistors being caused to change in accordance with a vibrato modulating signal applied to them. However, in such circuits it is necessary to provide a bridge network or the like to prevent the modulating signal from amplitude modulating the program signal, which, as decsribed above, is undesirable. Consequently, this structure requires a pair of thermistors in a bridge network for each phase shifting circuit, in addition to a large number of other components required for preventing amplitude modulation from occurring. The present invention provides a circuit embodying a simpler and less expensive arrangement.

It is therefore the principal object of the present invention to provide such a simple and economical construction of a vibrato circuit.

It is a further object of the present invention to provide a vibrato circuit employing only a single variable circuit component in a phase shifting circuit.

It is another object of the present invention to provide a phase shifting circuit, for use in phase modulating a program signal, where the phase shift applied is responsive to the intensity of a lamp.

It is a further object of the present invention to provide a vibrato circuit for phase modulating a program signal and to provide a visual indication of the amplitude, frequency, and wave shape of the vibrato modulating signal.

It is another object of the present invention to provide a variable vibrato circuit in which controls are provided for adjusting the frequency and amplitude of the vibrato modulating signal, and also for adjusting the wave shape of the vibrato modulating signal.

These and other objects of the present invention will become manifest upon an examination of this specification and the accompanying claims and drawings.

In one embodiment of the present invention, there is provided a plurality of phase shifting circuits adapted to shift the phase of a program signal in accordance with a vibrato modualting signal, each of the phase shifting circuits including a light dependent resistor or LDR, and a generator for generating a vibrato modulating signal. The vibrato modulating signal is applied to a lamp juxtaposed with the LDR's and causes them to vary their impedance in accordance with the vibrato modulating signal. The varying impedance of the LDR's causes a corresponding phase shift of the program signal, thereby creating a vibrato effect. Provision is made for independently adjusting the frequency, amplitude and wave shape of the vibrato modulating signal.

Figure 2:
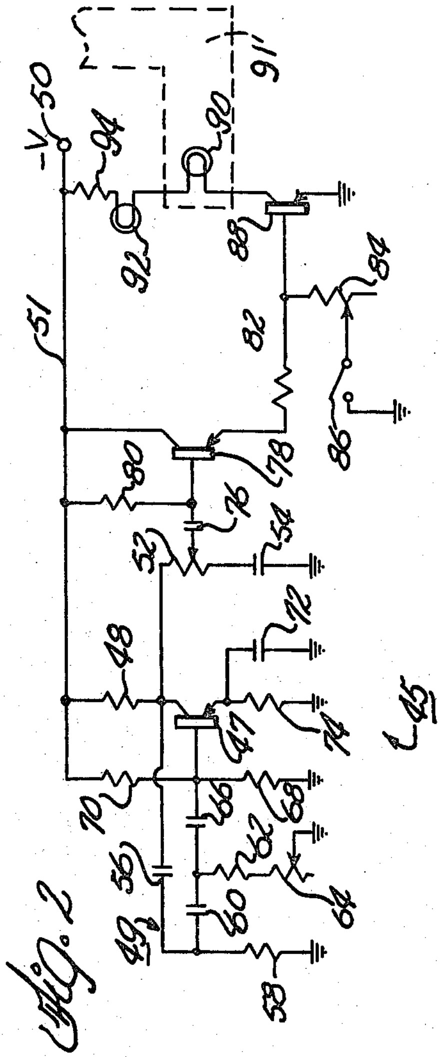

Reference will now be made to the accompanying drawings, in which:

FIG. 1 is a schematic circuit diagram of a vibrato circuit employing four phase shifting circuits; and FIG. 2 is a schematic circuit diagram of the generator apparatus which produces the modulating signal.

Referring now to FIG. 1, there is illustrated a pair of input terminals 10 interconnected with a first phase shifting circuit 12*a*. Three other identical phase shifting circuits, 12*b*, 12*c* and 12*d*, are connected in cascade, with the output of each circuit being connected to the input of the succeeding circuit. The output of the last phase shift stage 12*d* is connected to the input of an emitter follower stage 14, and the output of the emitter follower stage 14 is presented to a pair of output terminals 16. The source of the program signal such as an electronic organ, accordion or guitar with suitable pick up, or the like, is connected to the input terminals 10, while the output terminals 16 are connected preferably to a power amplifier 92 which is in turn connected to a loudspeaker 93 or the like. Thus, the signal originating at the input terminals 10 is modified by the four phase shifting stages 12 and passed to the output terminals 16.

Each of the phase shifting stages 12 includes a transistor 18 which is illustrated as a PNP transistor, but may alternatively be an NPN transistor provided certain changes are made in the voltage supply, as is well understood by those skilled in the art. One of the input terminals 10 is connected to ground, and the other is connected through a coupling capacitor 20 to the base of the transistor 18 in the first phase shifting stage 12*a*. A pair of resistors 22 and 24 are connected in series between ground and a line 26, connected to a source of negative potential, which will be more fully described hereinafter. The function of the resistors 22 and 24 is to establish the bias on the transistor 18. A resistor 28 is connected between the collector of the transistor 18 and the line 26, and a resitsor 30 is connected between the emitter of the transistor 18 and ground. The phase shifting stage 12 functions as a phase splitter and produces a first signal at the collector of the transistor 18 and a second signal, opposite in phase from the first signal, at the emitter of the transistor 18. The first and second signals are mixed in a series circuit including a capacitor 32 and a light dependent resistor or LDR 34, which circuit is connected in series between the emitter and the collector of the transistor 18. The output from the phase shifting stage 12 is taken from the junction of the capacitor 32 and the LDR 34. Thus the signal at the output of the phase shifting stage 12 is a composite signal including a component of each of the first and second signals. As the first signal from the collector of the transistor 18 is shifted in phase by being passed through the capacitor 32, the composite output signal is shifted in phase, relative to the input signal, between 0° and 90°, depending on the relative impedances of the capacitor 32 and the LDR 34.

The LDR 34 is a circuit component which functions as a linear bilateral resistor, but the value of resistance of the LDR 34 varies in accordance with the amount of light falling on it.

FIG. 2 illustrates a circuit of a generator for generating an oscillating light signal, which will be more fully described hereinafter. The oscillating light signal causes the LDR 34 to vary its resistance in response thereto. As the resistance of the LDR 34 is varied, the phase of the output of the phase shifting stage 12 is correspondingly varied. For example, when the resistance of the LDR 34 is lowered, the phase of the oputput of the phase shifting stage 12 becomes closer to that of the second signal at the emitter of the transistor 18. On the other hand, if the resistance of the LDR 34 is increased, the phase of the signal appearing at the output is shifted in phase toward the first signal connected through the capacitor 32. Thus, the phase shift between the input and oputput of each of the phase shifting circuits 12*a* through 12*d* is completely dependent upon the amount of light falling upon the LDR 34 incorporated in each circuit 12.

Although only the first phase shifting stage 12*a* has been specifically described, it will be understood that all of the remaining phase shift circuits 12*b*, 12*c* and 12*d* are identical thereto, and therefore function in the same way. The total phase shift is therefore four times that produced by a single one of the phase shifting stages 12. More or fewer of the circuits 12 may be used, depending upon the amount of phase shift desired.

The output of the last phase shifting circuit 12*d* is connected through a coupling capacitor 36 to the base of a transistor 38 in the emitter follower stage 14. The transistor 38 is biased by a voltage divider including resistors 40 and 42, connected between the line 26 and ground, and the junction of which is connected to the base of the transistor 38. The collector of the transistor 38 is connected directly to the line 26, and the emitter is connected to ground through a load resistor 41. The output is taken from the emitter of the transistor 38 and connected directly to one of the pair of output terminals 16, the other being grounded. It will be appreciated that the emitter follower stage 14 operates to present a relatively low output impedance, so that the operation of the succeeding amplifying stages will not materially affect the operation of the phase shifting circuits 12.

A source of negative potential 42 is connected to the line 26 through a low-pass smoothing filter 43 comprising a resistor 44 and a capacitor 46. The filter operates to smooth any voltage fluctuations which may occur at the source 42.

Referring now to FIG. 2, there is shown an oscillator 45 comprising a transistor 47, and a feedback network 49 including capacitors 56, 60 and 66, and resistors 58, 62 and 68. Such an oscillator is known as an RC oscillator, in that the frequency determining components are composed exclusively of resistors and capacitors. This type of oscillator is desirable for use at very low frequencies where the size of the required inductances for an LC oscillator would be extremely large.

The collector of the transistor 47 is connected through an output resistor 48 to a line 51, which in turn is connected to a source of potential 50, which is preferably the same potential as on line 26 of FIG. 1. The output of the oscillator 45 appears at the collector of the transistor 47, and is connected through the network 49 to the base of the transistor 47. The network 49 functions to shift the phase of the signal appearing at the collector of the transistor 47 to attain the positive feedback necessary for oscillation of the oscillator 45. The network 47 comprises three phase shifting circuits including, respectively, the capacitor 56 and the resistor 58; the capacitor 60, the resistor 62 and a potentiometer 64; and the capacitor 66 and the resistor 68. The output of the network, present at the junction of the capacitor 66 and the resistor 68, is connected to the base of the transistor 47. A resistor 70 is connected between the base of the transistor 47 and the line 51, and forms a voltage divider with the resistor 68 to bias the transistor 47. A parallel RC network including a capacitor 72 and a resistor 74 is connected between the emitter of the transistor 47 and ground, to reduce high frequency response of the transistor 47. The output of the oscillator 45, at the collector of the transistor 47, is also connected through a series circuit including a potentiometer 52 and a capacitor 54 to ground. The tap of the potentiometer 52 is connected through a capacitor 76 to the base of a transistor 78 connected in emitter follower configuration. A resistor 80 is connected between the base of the transistor 78 and the line 51 to bias the transistor 78. The collector of the transistor 78 is connected directly to the line 51, while its emitter is connected to ground through a resistor 82, a potentiometer 84 and a switch 86. The switch 86 is preferably of the foot-operated type, and is operable to turn the vibrato on and off as desired. The junction of the resistor 82 and the potentiometer 84 is connected to the base of a transistor 88. The emitter of the transistor 88 is connected to ground, and its collector is connected to the line 51 through a vibrato lamp 90, an indicating lamp 92 and a current limiting resistor 94.

In the operation of the generator of FIG. 2, the oscillator 45 produces a low frequency alternating signal, and the desired amplitude of the signal is selected by adjusting the tap of the potentiometer 52. The frequency of oscillation is dependent upon the position of the tap of the potentiometer 64, which controls the phase shifting characteristic of the network 49.

The output selected by the potentiometer 52 is amplified by the emitter follower 78, provided the foot switch 86 is closed, and the emitter-collector current of the transistor 78 controls the degree of conduction of the transistor 88, which drives the two lamps 90 and 92. Adjustment of the potentiometer 84 controls the bias of the transistor 88, and thus affects the duration during each cycle of the modulating signal that the transistor 88 is permitted to conduct sufficiently to light the lamps 90 and 92. The regulation of the position of the tap of the potentiometer 84 thus controls the wave-shape of the light generated by the lamps 90 and 92 during each cycle of the modulating signal generated by the oscillator 45. For example, when the potentiometer 84 is set near the middle of its range, the signal applied to the lamps 90 and 92 is substantially a sine wave. When the tap of the potentiometer 84 is moved downwardly as shown in FIG. 2, the steady state current through the lamps 90 and 92 is less because of the greater negative bias applied to the base of the transistor 88, and only a relatively large negative-going signal applied to the base of the transistor 78 can light the lamps 90 and 92. This causes the signal applied to the lamps 90 and 92 to have a shape which is generally a sine wave with a flattened bottom. Conversely, when the tap of the potentiometer 84 is moved upwardly as shown in FIG. 2, the steady state current through the transistor 78 is greater so that it saturates for relatively large negative-going signals applied to its base. This causes the signal applied to the lamps 90 and 92 to have a wave shape which is generally a sine wave with a flattened top. In each case, the light generated by the lamps 90 and 92 is responsive to the signal applied to them, and a corresponding wave shape exists for the light falling on the LDR's 34. The effect of the wave shape of the light may be noticed in the vibrato in terms of harshness or hardness of the vibrato. Adjustment of the potentiometer 84 provides easy and effective control over the vibrato hardness.

The vibrato lamp 90 is disclosed in a light-tight box 91 or container with the four LDR's 34 of FIG. 1. Preferably the vibrato lamp 90 is centrally disposed in the light-tight container and the LDR's are positioned on four sides of the lamp 90. A removable cover is preferably provided so that the lamp 90 may readily be replaced when necessary.

The indicating lamp 92 is disposed on the control panel of the apparatus, and the current flow through the panel lamp 92 is the same as the current flow through the vibrato lamp 90. Thus, the wave shape, amplitude and frequency of the vibrato signal may be easily inspected by observing the condition of the indicating lamp 92. The panel lamp 90 is designed to operate at the current flowing through the lamps 90 and 92 so that its intensity is sufficient to be easily observed by an operator. The vibrato lamp 92 is designed to operate at a higher current, however, so that its illumination of the LDR's 34 is relatively dim. This is sufficient, however, to give the required phase shift, while maintaining LDR operation on a relatively linear part of its characteristic.

When vibrato is desired, the foot switch 86 is closed, which operates to apply the vibrato signal through the output transistor 88 to the lamps 90 and 92. The frequency may be then adjusted by the potentiometer 64; the potentiometer 52 may be adjusted to provide the desired amplitude of modulated signal; and the potentiometer 84 may be adjusted to achieve the desired vibrato wave shape. The two lamps 90 and 92 cause the LDR's 34 of the phase shifting circuits 12 to shift the phase of the program signal in accordance with the alternating vibrato signal.

In one embodiment of the present invention, all of the transistors may be of the type MA288, and the other circuit components may be as follows:

| | |
|---|---|
| C20—0.1 | R58—18K |
| R22—330K | C60—0.47 |
| R24—220K | R62—18K |
| R28—3.3K | 64—50K |
| R30—3.3K | C66—0.47 |
| C32—.04 | R68—18K |
| LDR34—B-731-04-red. | R70—330K |
| C36—0.1 | C72—250.0 |
| R40—330K | R74—68K |
| R41—22K | C76—5.0 |
| R42—220K | R80—330K |
| R44—10K | R82—1K |
| C46—100 | 84—35 |
| R48—10K | 90—GE No. 19 Frosted |
| C54—5.0 | 92—GE No. 49 |
| C56—0.47 | R94—180 |

In another embodiment, the input terminals 10 are designed to be connected to a low impedance source, and in this case, the following components for stage 12*a* only have somewhat different values:

C20—5.0
R22—68K
R24—22K

From the foregoing, the present invention has been described in such detail as to enable one skilled in the art to make and use the same and, by applying current knowledge, readily to adapt the same for use under a variety of conditions without departing from the essential features of novelty involved, which are intended to be defined and secured by the appended claims.

What is claimed is:

1. In a vibrato circuit for introducing vibrato into a program signal, the output of said circuit being connected through a power amplifier to a utilization device, the combination comprising a plurality of phase shifting circuits connected in cascade, each of said phase shifting circuits comprising a non-inductive phase splitter, a fixed capcitor connected from one output of said phase splitter to an output of said circuit and a light dependent resistor connected from the opposite output of said phase splitter to said circuit output, the phase output of said phase shifting circuit being dependent upon the magnitude of the resistance of said light dependent resistor, means for connecting a program signal to the input of the phase splitter in the first of said cascaded phase shifting circuits, an oscillator, a control lamp connected to said oscillator and juxtaposed with said light dependent resistors to modulate the resistance of said light dependent resistors in accordance with the output of said oscillator, and an indicating lamp connected in series with said control lamp, said indicating lamp being disposed outside said light-tight chamber for providing a visual indication of the output of said oscillator.

2. Apparatus according to claim 1, wherein said indicating lamp has a lower design operating current than said first lamp.

3. Apparatus according to claim 2, including means in association with said oscillator for regulating the waveshape of the output of the oscillator.

4. Apparatus according to claim 3, wherein said oscillator includes a transistor connected in common emitter arrangement with said control lamp and said indicating lamp in series with the collector of said transistor, means for connecting said oscillator to the base of said transistor, and means for regulating the bias of said transistor for controlling the degree of satuation of the transistor and the wave shape of the current flowing through said transistor.

References Cited

UNITED STATES PATENTS

| | | | |
|---|---|---|---|
| 2,910,689 | 10/1959 | Grace. | |
| 3,119,890 | 1/1964 | Peterson | 84—1.25 |
| 3,255,297 | 6/1966 | Long | 250—206 X |
| 3,256,380 | 6/1966 | Meinema et al. | 84—1.25 |
| 3,257,495 | 6/1966 | Williams | 84—1.25 |
| 3,286,013 | 11/1966 | Brand et al. | 84—1.25 |
| 3,327,239 | 6/1967 | Carpenter | 250—206 X |

OTHER REFERENCES

Arroyo, Gil: "Light-Bulb Volume Expander," Electronics World, February 1962, pp. 104–105.

ARTHUR GAUSS, *Primary Examiner.*

ROBERT H. PLOTKIN, *Assistant Examiner.*

U.S. Cl. X.R.

250—206; 307—311; 323—21, 119; 328—155; 331—178, 137